United States Patent
Aiyoshi et al.

(10) Patent No.: US 10,026,025 B2
(45) Date of Patent: Jul. 17, 2018

(54) CARD READER

(71) Applicant: NIDEC SANKYO CORPORATION, Suwa-gun, Nagano (JP)

(72) Inventors: Hiroyuki Aiyoshi, Nagano (JP); Toshio Tatai, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 15/434,586

(22) Filed: Feb. 16, 2017

(65) Prior Publication Data

US 2017/0236038 A1 Aug. 17, 2017

(30) Foreign Application Priority Data

Feb. 16, 2016 (JP) ................................ 2016-026772

(51) Int. Cl.
*G06K 7/00* (2006.01)
*G06K 13/08* (2006.01)
*G06K 7/08* (2006.01)

(52) U.S. Cl.
CPC ......... *G06K 13/085* (2013.01); *G06K 7/0021* (2013.01); *G06K 7/084* (2013.01)

(58) Field of Classification Search
USPC ............................................... 235/475, 486
See application file for complete search history.

(56) References Cited

U.S. PATENT DOCUMENTS

| | | | | |
|---|---|---|---|---|
| 5,196,687 A | * | 3/1993 | Sugino | G06K 7/0021 235/441 |
| 5,850,079 A | * | 12/1998 | Ohwa | G06K 7/084 194/351 |
| 6,210,193 B1 | * | 4/2001 | Ito | G06K 7/0021 439/326 |
| 6,454,170 B1 | * | 9/2002 | Feeser | G06K 13/08 235/482 |
| 6,527,187 B1 | * | 3/2003 | Nagata | G06K 7/084 235/380 |
| 8,496,182 B2 | * | 7/2013 | Mizawa | G06K 13/0843 235/382 |
| 9,659,240 B2 | * | 5/2017 | Miyazawa | G06K 13/085 |

(Continued)

FOREIGN PATENT DOCUMENTS

JP 2010026826 A 2/2010

*Primary Examiner* — Tuyen K Vo
(74) *Attorney, Agent, or Firm* — Cantor Colburn LLP

(57) ABSTRACT

A card reader may include a fixed body having a card moving passage, a pulling-out prevention member supported by the fixed body and structured to turn between a closing position and an open position, and structured to prevent pulling-out of the card at the closing position, a first urging member which urges the pulling-out prevention member toward the closing position, a lock member to prevent turning of the pulling-out prevention member toward the open position, and a lock member drive mechanism. The lock member may be driven by the lock member drive mechanism and swung so as to be switched from one of an unlocking attitude permitting turning of the pulling-out prevention member toward the open position and a locking attitude interfering with the pulling-out prevention member and preventing turning of the pulling-out prevention member toward the open position to the other of the unlocking attitude and the locking attitude.

22 Claims, 8 Drawing Sheets

(56) References Cited

U.S. PATENT DOCUMENTS

| | | | |
|---|---|---|---|
| 2002/0170957 A1* | 11/2002 | May | B65H 1/025 235/379 |
| 2004/0079805 A1* | 4/2004 | Nagata | G06K 13/08 235/482 |
| 2004/0094629 A1* | 5/2004 | Hirasawa | B65H 9/101 235/479 |
| 2004/0245336 A1* | 12/2004 | Miyazawa | G06K 13/08 235/439 |
| 2005/0007728 A1* | 1/2005 | Takahashi | G06K 7/0026 361/600 |
| 2005/0116036 A1* | 6/2005 | Akahane | G06K 7/084 235/449 |
| 2010/0170949 A1* | 7/2010 | Ishikawa | G06K 13/08 235/439 |
| 2011/0121078 A1* | 5/2011 | Watanabe | G06K 13/08 235/486 |

* cited by examiner

CARD READER

CROSS REFERENCE TO RELATED APPLICATION

The present invention claims priority under 35 U.S.C. § 119 to Japanese Application No. 2016-026772 filed Feb. 16, 2016, the entire content of which is incorporated herein by reference.

FIELD OF THE INVENTION

At least an embodiment of the present invention may relate to a card reader which is provided with a pulling-out prevention function for a card which prevents pulling-out of an inserted card.

BACKGROUND

A card reader has been widely utilized which is provided with a pulling-out prevention function for a card structured to prevent pulling-out of a card inserted into its inside. A structure in this type of a card reader has been proposed which includes a pulling-out prevention member formed in a lever shape and turnably provided between a closing position where a card moving passage is closed and an open position where the card moving passage is opened, and the pulling-out prevention member is urged toward the closing position by a torsion coil spring (see Japanese Patent Laid-Open No. 2010-26826). In the card reader described in the Patent Literature, a restriction pin is linearly moved along a guide groove by a solenoid and the pulling-out prevention member located at the closing position and the restriction pin are interfered with each other. Therefore, even if a card is tried to be pulled out, turning toward the open position of the pulling-out prevention member is prevented by the restriction pin. Further, when energization to the solenoid is stopped, the restriction pin is linearly retreated from the position interfered with the pulling-out prevention member along the guide groove by an urging force of a compression coil spring and thus the pulling-out prevention member can be turned toward the open position.

The card reader described in the above-mentioned Patent Literature is structured so that a plunger of the solenoid is structured to be a free end and the restriction pin is moved to prevent turning of the pulling-out prevention member. Therefore, the pin may be inclined in a case that a large load is applied to the restriction pin from the pulling-out prevention member because the pulling-out prevention member is tried to be turned toward the open position by an external force. As a result, in a case that an end part of the pin is strongly abutted and caught by the guide groove, even when energization to the solenoid is stopped, it may be occurred that the restriction pin is unable to be retreated from the position interfered with the pulling-out prevention member by an urging force of the compression coil spring. Therefore, in the structure described in the above-mentioned Patent Literature, a stable operation of the pulling-out prevention member is not attained.

SUMMARY

In view of the problem described above, at least an embodiment of the present invention may advantageously provide a card reader in which the pulling-out prevention member structured to prevent pulling-out of a card is capable of being surely operated.

According to at least an embodiment of the present invention, there may be provided a card reader including a fixed body in which a card moving passage along which a card is moved is provided, a pulling-out prevention member which is supported by the fixed body so as to be capable of turning between a closing position closing the card moving passage and an open position opening the card moving passage, the pulling-out prevention member being structured to prevent pulling-out of the card at the closing position, a first urging member which urges the pulling-out prevention member toward the closing position, a lock member structured to prevent turning of the pulling-out prevention member toward the open position, and a lock member drive mechanism structured to drive the lock member. The lock member is structured to be driven by the lock member drive mechanism and swung with a swing support point structured between the lock member and the fixed body as a center so that the lock member is switched from one of an unlocking attitude permitting turning of the pulling-out prevention member toward the open position and a locking attitude interfering with the pulling-out prevention member and preventing turning of the pulling-out prevention member toward the open position to the other of the unlocking attitude and the locking attitude.

In the card reader in at least an embodiment of the present invention, the pulling-out prevention member is provided so as to be turnable between a closing position closing a card moving passage and an open position opening the card moving passage, and the lock member is driven by the lock member drive mechanism to be switched between an unlocking attitude permitting turning of the pulling-out prevention member toward the open position and a locking attitude interfering with the pulling-out prevention member and preventing turning of the pulling-out prevention member toward the open position. Therefore, even if a card is tried to be pulled out when the pulling-out prevention member is engaged with the card at the closing position, turning toward the open position of the pulling-out prevention member is prevented by the lock member and thus the pulling-out of the card can be prevented. Further, the lock member is driven by the lock member drive mechanism to be swung with a swing support point structured together with the fixed body as a center. Therefore, even when a large load is applied to the lock member from the pulling-out prevention member due to that the pulling-out prevention member is tried to be turned toward the open position by an external force, a situation is hard to be occurred that the lock member is inclined and an end part of the lock member is caught by a fixing member. Further, since the lock member is structured to be swung, the lock member is easily switched to the locking attitude and the unlocking attitude. Therefore, the pulling-out prevention member can be operated surely.

In at least an embodiment of the present invention, it is preferable that, when the lock member is set in the locking attitude, the swing support point is located in a direction in which the pulling-out prevention member presses the lock member. According to this structure, even when a load from the pulling-out prevention member is large, the load is received by the swing support point and thus the large load is not applied to the lock member drive mechanism.

In at least an embodiment of the present invention, it may be structured that the lock member is a movable arm provided on one side end part in an extending direction of the lock member with an abutting part structured to abut with the pulling-out prevention member in the locking attitude. In this case, it may be structured that the movable arm is connected with a connecting shaft, which is moved by the lock member drive mechanism, between the abutting part and the swing support point.

In at least an embodiment of the present invention, it may be structured that the lock member includes a first member provided with an abutting part structured to abut with the pulling-out prevention member in the locking attitude, and a second member which is connected with the first member through a support shaft and is relatively turnable to the first member with the support shaft as a center, and the second member structures the swing support point together with the fixed body. In this case, it may be structured that an end part of the second member on an opposite side to the first member structures the swing support point together with the fixed body. Further, the second member is connected with a connecting shaft which is moved by the lock member drive mechanism.

In at least an embodiment of the present invention, it may be structured that the lock member drive mechanism includes a solenoid structured to drive the lock member from one of the unlocking attitude and the locking attitude to the other of the unlocking attitude and the locking attitude, and a second urging member structured to urge the lock member from the other of the unlocking attitude and the locking attitude to the one of the unlocking attitude and the locking attitude. According to this structure, power of the solenoid is used to swing the lock member and the power of the solenoid is not required to turn the pulling-out prevention member. Further, the solenoid is not required to directly maintain a state that the pulling-out prevention member closes the card moving passage. Therefore, even when a solenoid whose output is small is used, pulling-out of a card can be prevented and thus a large electric current is not required to be supplied to the solenoid during operation. As a result, power saving can be attained. Further, a plunger of the solenoid is structured to be a free end and thus the lock member is easily inclined. However, the lock member is driven by the lock member drive mechanism to be swung with the swing support point as a center. Therefore, even when a large load is applied to the lock member from the pulling-out prevention member, a situation is hard to be occurred that the lock member is inclined and an end part of the lock member is caught by a fixing member. Accordingly, the pulling-out prevention member can be operated surely.

In at least an embodiment of the present invention, it may be structured that the lock member drive mechanism includes a solenoid structured to drive the lock member from one of the unlocking attitude and the locking attitude to the other of the unlocking attitude and the locking attitude, and also drive the lock member from the other of the unlocking attitude and the locking attitude to the one of the unlocking attitude and the locking attitude. According to this structure, power of the solenoid is used to swing the lock member and the power of the solenoid is not required to turn the pulling-out prevention member. Further, the solenoid is not required to directly maintain a state that the pulling-out prevention member closes the card moving passage. Therefore, even when a solenoid whose output is small is used, pulling-out of a card can be prevented and thus a large electric current is not required to be supplied to the solenoid during operation. As a result, power saving can be attained. Further, a plunger of the solenoid is structured to be a free end and thus the lock member is easily inclined. However, the lock member is driven by the lock member drive mechanism to be swung with the swing support point as a center. Therefore, even when a large load is applied to the lock member from the pulling-out prevention member, a situation is hard to be occurred that the lock member is inclined and an end part of the lock member is caught by a fixing member. Accordingly, the pulling-out prevention member can be operated surely.

In at least an embodiment of the present invention, it is preferable that the abutting part is a roller face of a roller provided in the lock member. According to this structure, the abutting part of the lock member is smoothly slid on the pulling-out prevention member and thus the locking attitude and the unlocking attitude of the lock member are surely switched to each other.

In at least an embodiment of the present invention, the pulling-out prevention member is structured to be turnable around an axial line which is parallel to a width direction of a card substantially perpendicular to a moving direction of the card and a thickness direction of the card. According to this structure, even when the pulling-out prevention member is urged by the first urging member to the closing position, the pulling-out prevention member can be easily turned by an inserted card to the open position.

In at least an embodiment of the present invention, it may be structured that the pulling-out prevention member includes a turning center part which is a turning center of the pulling-out prevention member, a card abutting part structured to abut with an end face of the card to prevent pulling-out of the card, and an abutted part with which the lock member is abutted in the locking attitude, and the card abutting part, the turning center part and the abutted part are disposed in this order along the moving direction of the card. According to this structure, even when turning of the pulling-out prevention member is prevented, a portion between the turning center part and the card abutting part can be resiliently bent so that a card is capable of being pulled out.

In at least an embodiment of the present invention, it may be structured that the card reader includes a sensor structured to detect insertion of the card, and the pulling-out prevention member is provided with an insertion detecting part for detecting the insertion of the card in cooperation with the sensor. According to this structure, a part of an insertion detection function of a card is provided in the pulling-out prevention member and thus another member for detecting insertion of a card in cooperation with the sensor is not required to be provided separately. Therefore, the structure of the card reader can be simplified.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Preferred embodiments of the present invention will be described below with reference to the accompanying drawings. In the following descriptions, a card 2 is moved in the "X" direction shown in FIG. 1, FIGS. 2A, 2B and 2C, and the like. The "Z" direction is a thickness direction of a card 2, and the "Y" direction is a width direction of a card 2 perpendicular to the "X" direction which is a moving direction of the card 2 and the "Z" direction which is a thickness direction of the card 2. In the following descriptions, the "X1" direction side is referred to as a "front side", the "X2" direction side is referred to as a "rear side", the "Y1" direction side is a "right side", the "Y2" direction side is a "left side", the "Z1" direction side is an "upper side", and the "Z2" direction side is a "lower side". Further, in the following descriptions, a turning direction is referred to as a "clockwise direction CW" and a "counterclockwise direction CCW" with the reference when viewed in a direction shown in FIGS. 2A, 2B and 2C.

First Embodiment (Schematic Structure of Card Reader)

Figure 1:
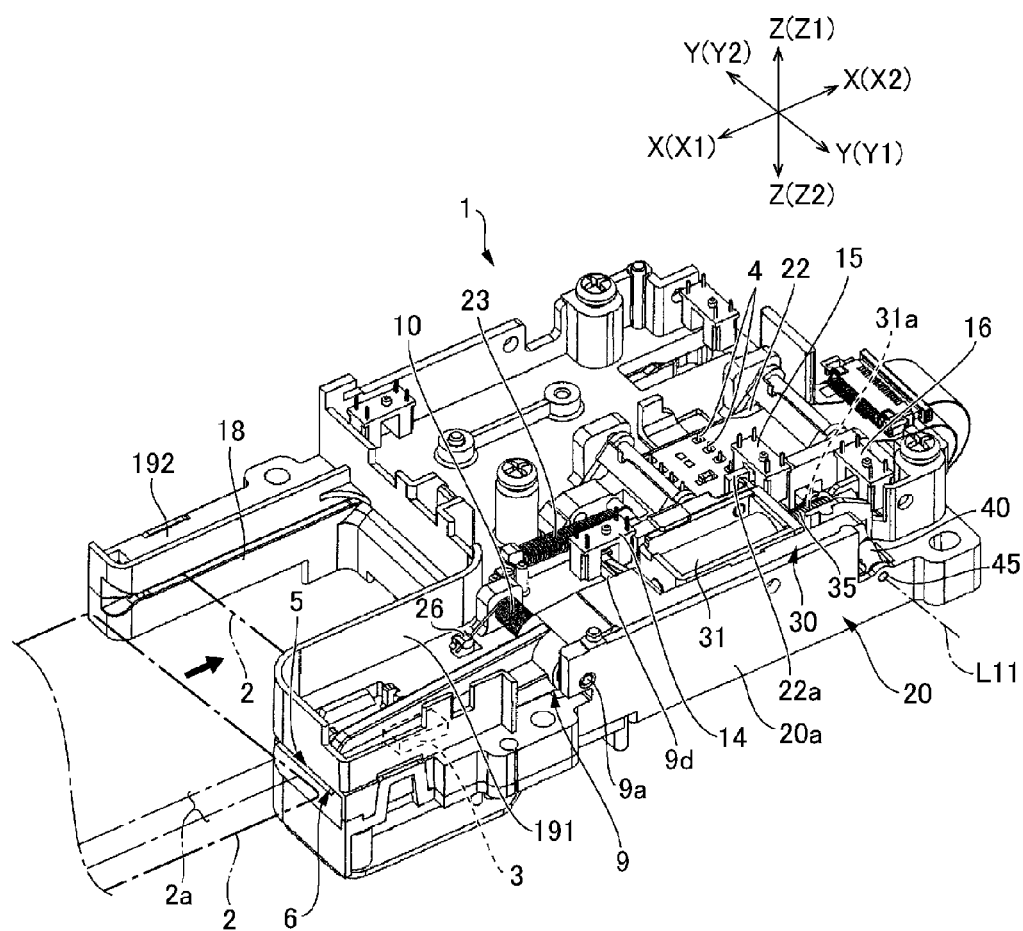
FIG. 1 is a perspective view showing a part of a card reader in accordance with a first embodiment of the present invention.
Figure 2A:
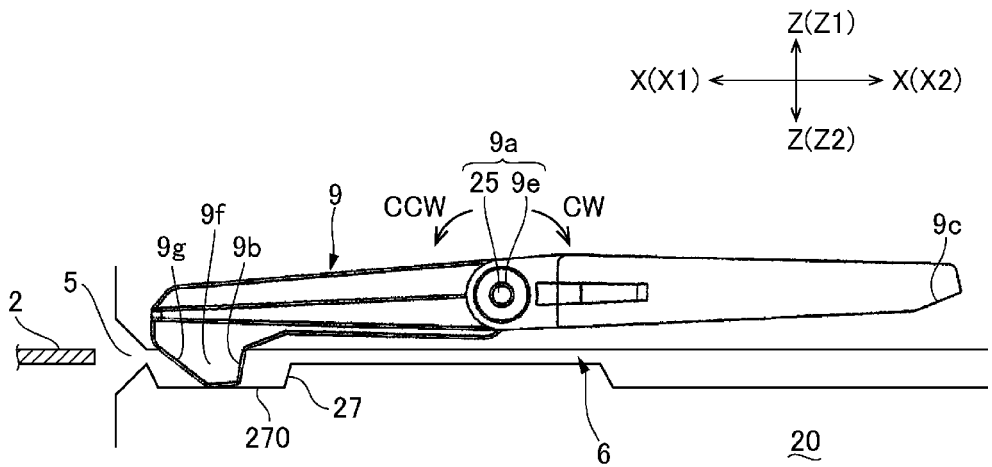
FIGS. 2A, 2B and 2C are explanatory views showing a pulling-out prevention member of the card reader shown in FIG. 1.
Figure 2B:
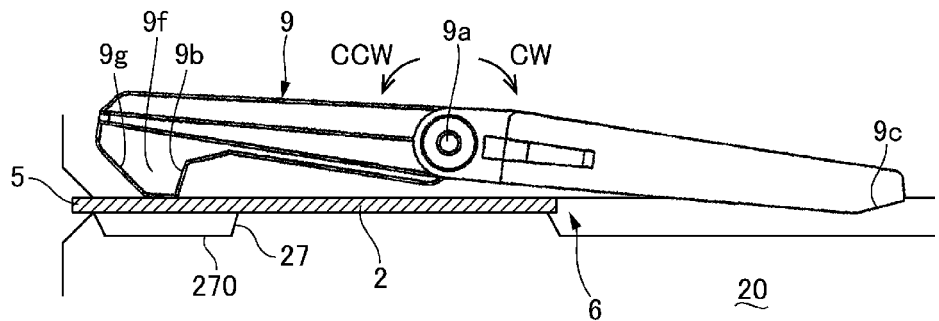
Figure 2C:
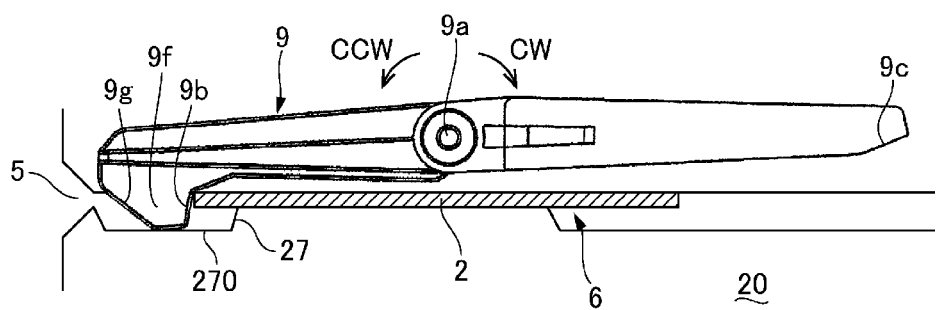

FIG. 1 is a perspective view showing a part of a card reader 1 in accordance with a first embodiment of the present invention. FIGS. 2A, 2B and 2C are explanatory views showing a pulling-out prevention member 9 of the card reader 1 shown in FIG. 1. FIG. 2A is an explanatory view showing a state before a card is inserted, FIG. 2B is an explanatory view showing a state when a card has begun to be inserted, and FIG. 2C is an explanatory view showing a state when a card has finished to be inserted.

In FIG. 1, a card reader 1 in this embodiment is a device which is structured so that a card 2 is manually operated by a user to read information recorded in the card 2 and to record information to the card 2. A magnetic head 3 and IC contact points 4 configured to read information recorded in the card 2 and record information to the card 2 are provided on an inner side of a fixed body 20 such as a frame. Further, as shown in FIGS. 2A, 2B and 2C, the fixed body 20 is provided with a card moving passage 6 in a straight line shape in a front and rear direction along which a card 2 inserted into a card insertion port 5 is moved.

The card reader 1 includes a pulling-out prevention member 9 structured to prevent pulling-out of a card 2 inserted into its inside. The pulling-out prevention member 9 is formed in a lever shape extended in the front and rear direction. The pulling-out prevention member 9 is turnably supported by the fixed body 20 between a closing position where the card moving passage 6 is closed (see FIGS. 2A and 2C) and an open position where the card moving passage 6 is opened (see FIG. 2B). As shown in FIG. 2C, pulling-out of an inserted card 2 is capable of being prevented by the pulling-out prevention member 9 at the closing position.

The card reader 1 includes a first urging member 10 such as a torsion coil spring which urges the pulling-out prevention member 9 toward the closing position, a lock member 40 structured to prevent turning of the pulling-out prevention member 9 toward the open position, and a lock member drive mechanism 30. The lock member drive mechanism 30 includes, as described below, a solenoid 31 structured to swing the lock member 40 to a locking attitude in which the lock member 40 is interfered with the pulling-out prevention member 9 located at the closing position, and a second urging member 35 configured to swing the lock member 40 to an unlocking attitude in which the lock member 40 is separated from the pulling-out prevention member 9 located at the closing position. In this embodiment, the second urging member 35 is a compression coil spring or the like which is disposed so as to be helically wound around a plunger 31a of the solenoid 31.

(Structure of Sensor)

The card reader 1 includes two sensors (a first sensor 14 and a second sensor 15) for detecting existence/absence of a card 2 and a third sensor 16 for detecting that the lock member 40 is located in a locking attitude. In this embodiment, each of the first sensor 14, the second sensor 15 and the third sensor 16 is an optical type sensor provided with a light emitting element (not shown) and a light receiving element (not shown) which are oppositely disposed to each other. The first sensor 14, the second sensor 15 and the third sensor 16 are respectively fixed to the fixed body 20. In the following descriptions, in each of the sensors 14 through 16, a state that a light from the light emitting element to the light receiving element is intercepted is an "ON" state, and a state that the light receiving element receives the light from the light emitting element is an "OFF" state.

(Basic Operation)

A card 2 is, for example, a rectangular card made of vinyl chloride whose thickness is about 0.7-0.8 mm. A magnetic stripe 2a where magnetic information is recorded is formed on a surface of the card 2 and, in this embodiment, a card 2 is a magnetic card. Further, an IC chip (not shown) is fixed to a surface of the card 2. In other words, a card 2 in this embodiment is also a contact type IC card. In accordance with an embodiment of the present invention, a card 2 may be fixed with an IC chip without being formed with a magnetic stripe 2a. Further, the card 2 may be incorporated with an antenna for communication and/or may be formed on a surface of the card 2 with a print part where printing is performed by a thermal method. In addition, the card 2 may be a PET (polyethylene terephthalate) card whose thickness is about 0.18-0.36 mm or may be a paper card having a predetermined thickness, or the like.

A portion on a front end side of the card reader 1 is formed with a cut-out part 18 which is cut out so that a card 2 is capable of being inserted by a user and the card 2 is capable of being pulled out. Specifically, the cut-out part 18 whose shape when viewed in the upper and lower direction is a substantially rectangular shape is formed in the fixed body 20 of the card reader 1 so as to be cut out from a front end toward a rear side. Further, the cut-out part 18 is formed at an intermediate position of the fixed body 20 of the card reader 1 in the right and left direction, and a right side protruded part 191 and a left side protruded part 192 are formed on both sides of the cut-out part 18 in the right and left direction. In this embodiment, as shown by the two-dot chain line in FIG. 1, a part of a card 2 inserted to a rear side of the card reader 1 is exposed in the cut-out part 18.

A front end of the card moving passage 6 is formed to be a card insertion port 5. In other words, the card insertion port 5 is formed at the front end of the right side protruded part 191 and the front end of the left side protruded part 192. Further, a magnetic head 3 is disposed in the vicinity of the card insertion port 5. IC contact points 4 are disposed on the rear end side of the card reader 1. Further, the IC contact points 4 are disposed to an upper side of the card moving passage 6. The IC contact points 4 are fixed to a contact point holding member 22. A rear end side of the contact point holding member 22 is formed with a card engaging part (not shown) with which a tip end (rear side end in the "X2" direction side) of a card 2 is capable of being engaged. A part of the contact point holding member 22 is engaged with a guide groove (not shown) and the contact point holding member 22 is guided by the guide groove and is moved up and down while sliding in the front and rear direction. Specifically, the contact point holding member 22 is moved downward while being moved to a rear side and is moved upward while being moved to a front side. Further, the contact point holding member 22 is urged to the front side by a tension coil spring 23. In accordance with an embodiment of the present invention, it may be structured that the contact point holding member 22 is connected with a link mechanism and the contact point holding member 22 is moved up and down while sliding in the front and rear direction by the link mechanism.

When a tip end of a card 2 inserted to a rear side of the card reader 1 is engaged with a card engaging part of the contact point holding member 22, the contact point holding member 22 is moved downward while sliding to a rear side so that the IC contact points 4 are contacted with an IC chip of the card 2. Further, when the card 2 inserted to the rear side is pulled to a front side, the contact point holding member 22 is moved upward while sliding to the front side by an urging force of the tension coil spring 23 so that the IC contact points 4 are separated from the surface of the card 2.

The contact point holding member 22 is formed with a detecting projection 22a configured to detect existence/absence of a card 2 located on the rear end side in cooperation with the second sensor 15. In this embodiment, when a card 2 is inserted to the rear side of the card reader 1, the contact point holding member 22 is slid to the rear side and, when the IC contact points 4 are contacted with an IC chip of the card 2, a light from the light emitting element to the light receiving element of the second sensor 15 is intercepted by the detecting projection 22a. Further, the detecting projection 22a and the second sensor 15 are disposed so that, when the contact point holding member 22 is located on the front side by an urging force of the tension coil spring 23, the light receiving element of the second sensor 15 receives a light from the light emitting element. In other words, when a light from the light emitting element of the second sensor 15 to the light receiving element is intercepted by the detecting projection 22a and the second sensor 15 is turned in an "ON" state, it is detected that a card 2 is existed on the rear end side of the card reader 1.

(Detailed Structure of Pulling-out Prevention Member 9)

Figure 3A:
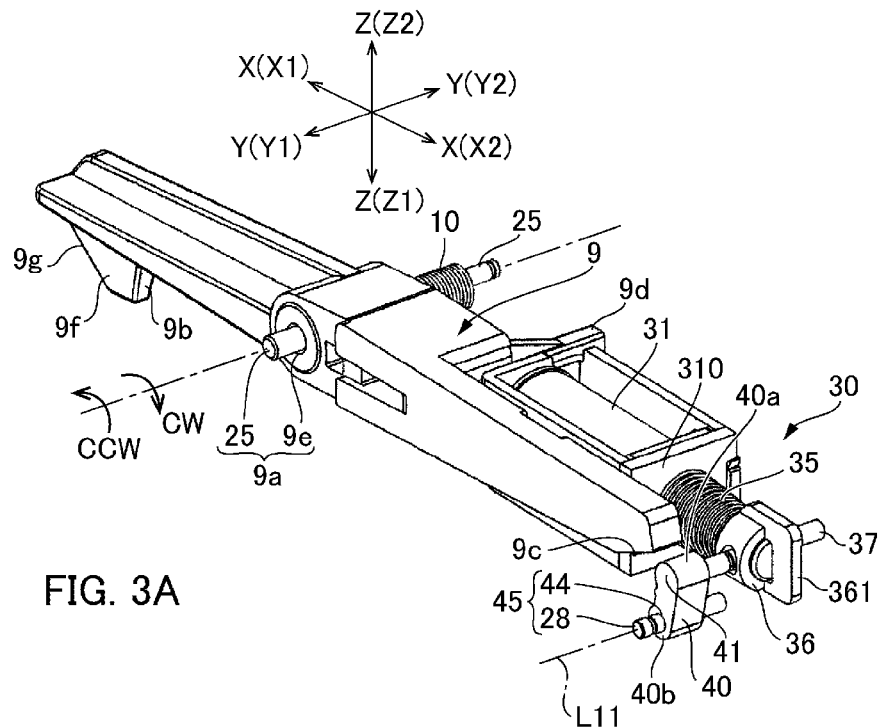
FIGS. 3A and 3B are perspective views showing a pulling-out prevention member, a lock member drive mechanism and the like of the card reader in accordance with the first embodiment of the present invention.
Figure 3B:
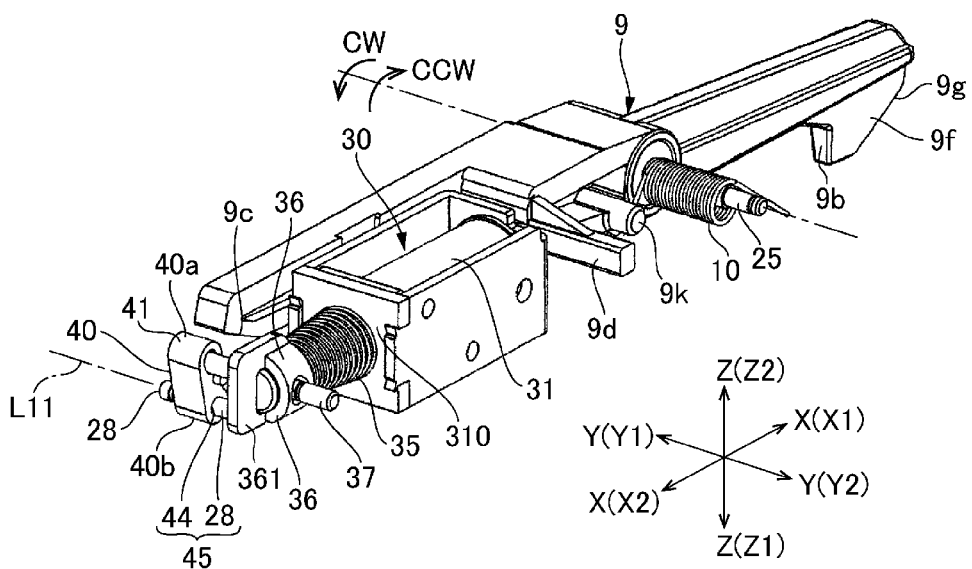
Figure 4A:
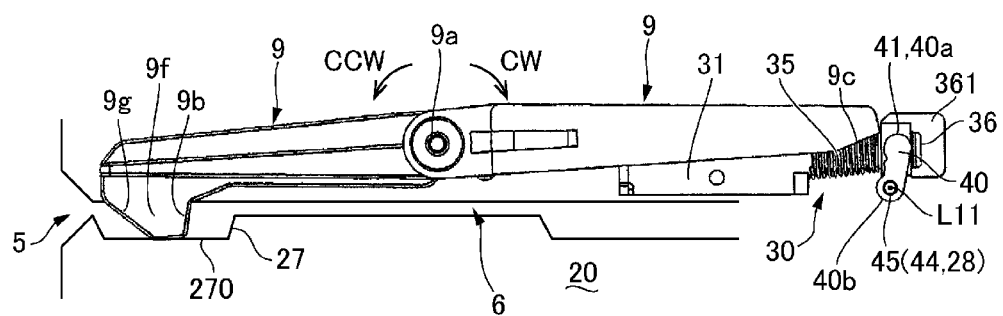
FIGS. 4A and 4B are right side views showing a lock member and the like shown in FIGS. 3A and 3B.
Figure 4B:
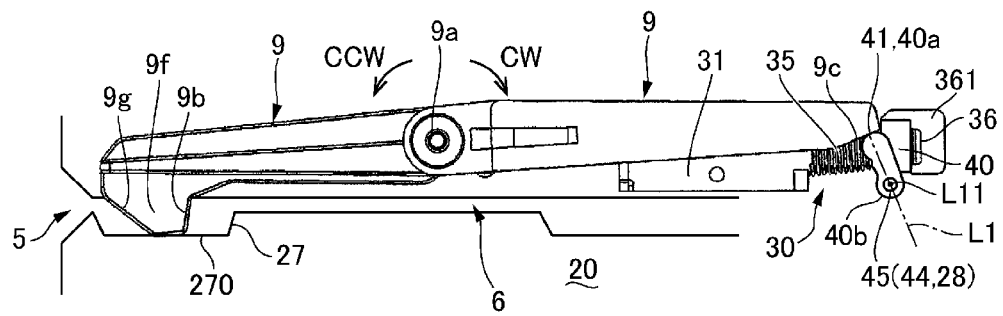

FIGS. 3A and 3B are perspective views showing the pulling-out prevention member 9, a lock member drive mechanism and the like of the card reader 1 in accordance with the first embodiment of the present invention. FIG. 3A is a perspective view showing the pulling-out prevention member 9 and the like which are viewed from a right side on the rear side, and FIG. 3B is a perspective view showing the pulling-out prevention member 9 and the like which are viewed from a left side on the rear side. FIGS. 4A and 4B are right side views showing a lock member 40 and the like shown in FIGS. 3A and 3B. FIG. 4A is a right side view showing a state when a lock member 40 is set in an open attitude and FIG. 4B is a right side view showing a state when the pulling-out prevention member 9 is set in a locking attitude.

The pulling-out prevention member 9 shown in FIGS. 1 through 4B functions to prevent pulling-out of a card 2 inserted into the inside of the card reader 1. Specifically, the pulling-out prevention member 9 prevents pulling-out of a card 2 when an IC chip of the card 2 and the IC contact points 4 are contacted with each other to exchange information. The pulling-out prevention member 9 is, for example, formed of resin. Further, the pulling-out prevention member 9 is formed in a long and thin bar shape as a whole and is, as shown in FIG. 1, disposed on the right end side of the card reader 1 so that its longitudinal direction is the front and rear direction.

The pulling-out prevention member 9 is provided with a turning center part 9a which is a turning center of the pulling-out prevention member 9, a card abutting part 9b configured to abut with a rear end (near end, the "X1" direction side) of a card 2 and prevent pulling-out of the card 2, and an abutted part 9c configured to abut with a lock member 40. Further, the pulling-out prevention member 9 is provided with a card detecting part 9d configured to detect existence/absence of the card 2 on the front end side in cooperation with the first sensor 14. In this embodiment, insertion of a card 2 to the card reader 1 is also detected by the first sensor 14 and the card detecting part 9d. The first sensor 14 is a sensor structured to detect insertion of a card 2 and the card detecting part 9d is an insertion detecting part configured to detect insertion of the card 2 to the card reader 1 in cooperation with the first sensor 14.

The card abutting part 9b is disposed on the front end side and the abutted part 9c is disposed on the rear end side. Further, the turning center part 9a is disposed at a substantially center in the front and rear direction between the card abutting part 9b and the abutted part 9c. In other words, the card abutting part 9b, the turning center part 9a and the abutted part 9c of the pulling-out prevention member 9 are disposed from the front side toward the rear side in this order in the moving direction of a card 2. The card detecting part 9d is formed so as to protrude to the right end side. The turning center part 9a is disposed to an upper side of the card moving passage 6. In the turning center part 9a, a support shaft 25 provided on a side of the fixed body 20 is fitted into a shaft hole 9e of the pulling-out prevention member 9.

A protruded part 9f protruding toward a lower side is formed at a front end of the card abutting part 9b. A front side face of the protruded part 9f is formed to be an inclined face 9g which is gradually inclined downward toward the rear side. On the other hand, a rear side face of the protruded part 9f is formed to be a perpendicular face in a flat face shape which is substantially perpendicular to the conveying direction ("X" direction) of a card 2. The rear side face of the protruded part 9f is the card abutting part 9b which is capable of abutting with a rear end of a card 2 being pulled out.

The abutted part 9c is disposed to an upper side of the card moving passage 6. The abutted part 9c is formed to be an inclined face which is gradually inclined to an upper direction as going to the rear side.

The support shaft 25 is fixed to the fixed body 20 of the card reader 1 with the right and left direction as its axial line direction. Further, the support shaft 25 is inserted into the first urging member 10 structured of a torsion coil spring. The first urging member 10 is disposed on the left side of the turning center part 9a. One end of the first urging member 10 is engaged with a spring engaging part 26 formed on the fixed body 20 of the card reader 1 and the other end of the first urging member 10 is engaged with a protruded part 9k formed on the pulling-out prevention member 9. The spring engaging part 26 is disposed on a front side with respect to the support shaft 25 and the protruded part 9k is disposed on the rear side with respect to the support shaft 25 and thus the first urging member 10 urges the pulling-out prevention member 9 in the counterclockwise direction CCW. Therefore, when a card 2 is not inserted, as shown in FIG. 2A, a lower end of the protruded part 9f of the pulling-out prevention member 9 is abutted with a bottom face 270 of a recessed part 27 of the card moving passage 6 and, in this state, when a card 2 is not inserted, the pulling-out prevention member 9 closes a front end side of the card moving passage 6. When the front end side of the card moving passage 6 is closed, the pulling-out prevention member 9 is located at the closing position.

In this state, when a card 2 is inserted, a tip end of the card 2 is abutted with the inclined face 9g of the pulling-out prevention member 9. When the card 2 is further inserted to the rear side, as shown in FIG. 2B, the pulling-out prevention member 9 is turned in the clockwise direction CW against an urging force of the first urging member 10 and the front end side of the card moving passage 6 is opened. When the front end side of the card moving passage 6 is opened, the pulling-out prevention member 9 is located at an open position.

When the card 2 is further inserted to the rear side and a rear end of the card 2 has passed through a lower side of the protruded part 9f, as shown in FIG. 2C, the pulling-out prevention member 9 is turned in the counterclockwise direction "CCW" by an urging force of the first urging member 10 until the lower end of the protruded part 9f is abutted with the bottom face 270 of the recessed part 27 and the front end side of the card moving passage 6 is closed.

In the pulling-out prevention member 9, the card detecting part 9d is formed so as to protrude toward the left direction from a rear side with respect to the turning center part 9a. The card detecting part 9d and the first sensor 14 are disposed so that, when the pulling-out prevention member 9 is located at the closing position as shown in FIGS. 2A and 2C, a light from the light emitting element to the light receiving element of the first sensor 14 is intercepted by the card detecting part 9d and, when the pulling-out prevention member 9 is located at the open position as shown in FIG. 2B, the light from the light emitting element is received by the light receiving element of the first sensor 14. In other words, in this embodiment, when a light from the light emitting element is received by the light receiving element of the first sensor 14 and the first sensor 14 is turned to an "OFF" state, it is detected that a card 2 is existed on the front end side of the card reader 1.

(Structure of Lock Member 40 and the Like)

As shown in FIGS. 2A through 4B, the card reader 1 includes a lock member drive mechanism 30 and a lock member 40 which is driven by the lock member drive mechanism 30 in order to prevent pulling-out of a card 2 even when the card 2 is tried to be pulled out in a state shown in FIG. 2C. In this embodiment, when the pulling-out prevention member 9 is located at the closing position, the lock member 40 is driven by the lock member drive mechanism 30 and swung around the axial line "L11" with a swing support point 45 structured between the lock member 40 and the fixed body 20 as a swing center. As a result, the lock member 40 is turned from an unlocking attitude (see FIG. 4A) where turning of the pulling-out prevention member 9 toward the open position is permitted to a locking attitude (see FIG. 4B) where the lock member 40 is interfered with the pulling-out prevention member 9 to prevent turning of the pulling-out prevention member 9 toward the open position.

The lock member 40 is provided on a rear side with respect to the pulling-out prevention member 9. The lock member 40 is a movable arm extended in the upper and lower direction and both end parts in the extending direction of the lock member 40 are formed to be a circular arc face. The lock member 40 is provided at one side end part 40a in the extending direction with an abutting part 41 which is abutted with the abutted part 9c of the pulling-out prevention member 9 when the lock member 40 is turned to the locking attitude, and the swing support point 45 is structured in the vicinity of the other side end part 40b in the extending direction between the fixed body 20 and the lock member 40. The swing support point 45 includes a support shaft 28 supported by a side wall 20a of the fixed body 20 and a shaft hole 44 formed in the lock member 40, and the support shaft 28 is fitted into the shaft hole 44. Therefore, the lock member 40 is capable of swinging with a center axial line (axial line "L11") of the support shaft 28 as a center.

In this embodiment, the lock member drive mechanism 30 includes a solenoid 31 structured to swing the lock member 40 to the front side, and a second urging member 35 which urges the lock member 40 to the rear side so that the abutting part 41 is separated to the rear side from the abutted part 9c of the pulling-out prevention member 9. The solenoid 31 is structured so that a plunger 31a is protruded to the rear side from a main body part 310, and the plunger 31a is disposed so as to move in the front and rear direction. The second urging member 35 is a compression coil spring which is disposed around the plunger 31a. The second urging member 35 is disposed so as to be compressed between the main body part 310 of the solenoid 31 fixed to the fixed body 20 and a cap 36 provided on a tip end side of the plunger 31a, and the second urging member 35 urges the cap 36 to the rear side. Further, a tip end part of the plunger 31a and the cap 36 are connected with the lock member 40 between the abutting part 41 of the lock member 40 and the swing support point 45 through a connecting shaft 37.

In the lock member drive mechanism 30 structured as described above, the solenoid 31 is set in a non-driven state in which the solenoid 31 is not energized during a period when a card 2 is inserted as shown in FIGS. 2A and 2B. In this non-driven state, as shown in FIG. 4A, the plunger 31a and the cap 36 are protruded to the rear side by an urging force of the second urging member 35. Therefore, the lock member 40 is inclined to the rear side with the swing support point 45 as a center so that the abutting part 41 is located on the rear side with respect to the abutted part 9c of the pulling-out prevention member 9. Accordingly, the pulling-out prevention member 9 is capable of turning to the open direction (turning in the clockwise direction "CW").

On the other hand, the solenoid 31 is set in a driven state in which the solenoid 31 is energized during a period when the pulling-out prevention member 9 is engaged with a card 2 as shown in FIG. 2C. In this driven state, the plunger 31a is attracted to the front side against the urging force of the second urging member 35. Therefore, as shown in FIG. 4B, the lock member 40 is set in the locking attitude in which the lock member 40 is inclined to the front side with the swing support point 45 as a center so that the abutting part 41 is abutted with the abutted part 9c of the pulling-out prevention member 9. Accordingly, the pulling-out prevention member 9 is prevented from turning to the open direction (turning in the clockwise direction CW) by the lock member 40. As a result, even when a card 2 is tried to be pulled out, the pulling-out of the card 2 is prevented by the pulling-out prevention member 9.

In this embodiment, in the state shown in FIG. 4B, the swing support point 45 of the lock member 40 is located in a pressing direction in which the pulling-out prevention member 9 presses the lock member 40. More specifically, when an imaginary line "L1" is drawn from a position of the abutted part 9c of the pulling-out prevention member 9 with which the abutting part 41 of the lock member 40 is abutted so as to be perpendicular to the abutted part 9c, the swing support point 45 is located on the imaginary line "L1".

The cap 36 is provided with a plate-shaped detected part 361 configured to detect a position of the lock member 40 in cooperation with a third sensor 16. In this embodiment, when the plunger 31a is protruded to the rear side, a light from a light emitting element to a light receiving element of the third sensor 16 is intercepted by the detected part 361. Further, the detected part 361 and the third sensor 16 are disposed so that, when the solenoid 31 is driven and the plunger 31a is attracted to the front side, a light from the light emitting element of the third sensor 16 is received by the light receiving element. Therefore, when a light from the light emitting element of the third sensor 16 is received by the light receiving element to make the third sensor 16 turn to an "OFF" state, it is detected that the lock member 40 is set in a locking attitude.

(Schematic Operation of Card Reader)

In the card reader 1 in this embodiment, as shown in FIG. 2A, when a card 2 is not inserted, the pulling-out prevention member 9 closes the front end side of the card moving passage 6 by an urging force of the first urging member 10. In this state, the plunger 31a is protruded to the rear side by an urging force of the second urging member 35 and thus the pulling-out prevention member 9 is capable of turnable toward the open position. Further, the contact point holding member 22 is urged to the front side by the tension coil spring 23 and the IC contact points 4 are disposed to an upper side of the card moving passage 6. In this state, the first sensor 14 and the third sensor 16 are set in "ON" states and the second sensor 15 is set in an "OFF" state.

Next, as shown in FIG. 2B, when a card 2 is inserted, the pulling-out prevention member 9 is turned in the clockwise direction "CW" by the inserted card 2 against an urging force of the first urging member 10 and the front end side of the card moving passage 6 is opened. When the pulling-out prevention member 9 is turned in the clockwise direction "CW", the card detecting part 9d is separated from a position between the light emitting element and the light receiving element of the first sensor 14 and thus a light from the light emitting element of the first sensor 14 is received by the light receiving element. Therefore, the first sensor 14 is turned to an "OFF" state and insertion of a card 2 is detected.

When the card 2 is further inserted to the rear side and a rear end of the card 2 has passed through the lower side of the protruded part 9f, as shown in FIG. 2C, the pulling-out prevention member 9 is turned in the counterclockwise direction "CCW" by the urging force of the first urging member 10 and the front end side of the card moving passage 6 is closed. Further, when the pulling-out prevention member 9 is turned in the counterclockwise direction "CCW", the light from the light emitting element of the first sensor 14 to the light receiving element is intercepted by the card detecting part 9d and thus the first sensor 14 is turned to the "ON" state again.

Further, when the card 2 is inserted to the rear side, the contact point holding member 22 is moved downward while sliding to the rear side by the inserted card 2 and the IC contact points 4 are contacted with an IC chip of the card 2. In this state, information is exchanged between the IC chip of the card 2 and the IC contact points 4. Further, when the contact point holding member 22 is slid to the rear side, a light from the light emitting element of the second sensor 15 to the light receiving element is intercepted by the detecting projection 22a and the second sensor 15 is turned to an "ON" state and, as a result, it is detected that the card 2 is located on the rear end side.

In this embodiment, when the first sensor 14 having been turned to an "OFF" state is turned to an "ON" state again and, in addition, when the second sensor 15 is turned to an "ON" state, the solenoid 31 is driven and thus the plunger 31a is attracted to the front side and the abutting part 41 of the lock member 40 is abutted with the abutted part 9c. Therefore, movement to the open position of the pulling-out prevention member 9 is restricted. Accordingly, even when a user tries to pull out a card 2 to the front side, a rear end of the card 2 is abutted with the card abutting part 9b of the pulling-out prevention member 9 and thus pulling-out of the card 2 is prevented. In this embodiment, when the plunger 31a is attracted to the front side, the third sensor 16 is turned to an "OFF" state.

When the exchange of information is finished between the IC chip of the card 2 and the IC contact points 4, the energization to the solenoid 31 is stopped and thus the plunger 31a is protruded to the rear side by the urging force of the second urging member 35. In other words, the pulling-out prevention member 9 is set in a turnable state. In this state, the card 2 can be pulled out toward the front side.

In a case that magnetic information recorded in a magnetic stripe 2a is reproduced in addition to exchange of information between an IC chip of the card 2 and the IC contact points 4 or, instead of exchange of information between an IC chip of the card 2 and the IC contact points 4, the magnetic information is reproduced when the card 2 is inserted or is pulled out. Further, a frictional force between the card 2 and the IC contact points 4 when the IC contact points 4 are contacted with an IC chip of the card 2 is set to be slightly larger than the urging force of the tension coil spring 23. Therefore, even when the pulling-out prevention member 9 is set in a turnable state, the card 2 is not abruptly pushed out to the front side freely.

Principal Effects in this Embodiment

As described above, in this embodiment, the card moving passage 6 is closed by the pulling-out prevention member 9 by utilizing an urging force of the first urging member 10 and turning of the pulling-out prevention member 9 which has closed the card moving passage 6 is restricted by the lock member 40. In this case, the lock member drive mechanism 30 structured to drive the lock member 40 includes the solenoid 31 structured to drive the lock member 40 from an unlocking attitude to a locking attitude and the second urging member 35 which urges the lock member 40 in a direction setting to the unlocking attitude. Therefore, the pulling-out prevention member 9 is not required to be turned by power of the solenoid 31, and the pulling-out prevention member 9 is not required to maintain a state that the card moving passage 6 is closed by using the power of the solenoid 31. Therefore, according to this embodiment, even when the solenoid 31 with a small output is used, pulling-out of a card 2 can be prevented and a large electric current is not required to be supplied to the solenoid 31 during operation. As a result, in this embodiment, power saving can be attained. Further, since power saving can be attained, so-called bus power can be adopted in which electric power supplied from a cable such as a USB is used for operating various devices inside the card reader 1.

In this embodiment, the lock member 40 is driven by the lock member drive mechanism 30 and is swung with the swing support point 45 as a center so that the lock member 40 is switched to an unlocking attitude which permits turning of the pulling-out prevention member 9 toward the open position and to a locking attitude in which the lock member 40 is interfered with the pulling-out prevention member 9 to prevent turning of the pulling-out prevention member 9 toward the open position. Therefore, when the lock member 40 is set in the locking attitude, even in a case that a large load is applied to the lock member 40 from the pulling-out prevention member 9 in order that the pulling-out prevention member 9 is tried to be turned toward the open position by an external force, it may be hard to occur that the lock member 40 is inclined and, for example, an end part of the lock member 40 is caught by the fixed body 20. Especially, in this embodiment, the solenoid 31 is connected with the lock member 40 in a cantilevered state. Therefore, when a load from the pulling-out prevention member 9 is transmitted to the plunger 31a of the solenoid 31, the lock member 40 may be inclined. However, according to this embodiment, even in this case, an end part of the lock member 40 is hard to be caught by the fixed body 20. Further, in this embodiment, when the lock member 40 is set in the locking attitude, the swing support point 45 is located in a pressing direction in which the pulling-out prevention member 9 presses the lock member 40. Therefore, even when a load from the pulling-out prevention member 9 is large, the load can be received by the swing support point 45 and thus a large load is not applied to the solenoid 31 of the lock member drive mechanism 30. Therefore, a state that the plunger 31a of the solenoid 31 is inclined to cause the lock member 40 to incline is hard to be occurred. Further, the lock member 40 is structured so as to be swung, the lock member 40 can be surely switched to the locking attitude and the unlocking attitude. Therefore, the pulling-out prevention member 9 can be operated surely.

The pulling-out prevention member 9 is turnable around the axial line extending in the right and left direction. Therefore, even when the pulling-out prevention member 9 is urged to the closing position by the first urging member 10, the pulling-out prevention member 9 can be easily turned to the open position by an inserted card 2. Especially, in this embodiment, the front end face of the card abutting part 9b is formed to be the inclined face 9g and thus the pulling-out prevention member 9 can be easily turned to the open position by an inserted card 2.

The pulling-out prevention member 9 is provided with the card detecting part 9d configured to detect insertion of a card 2 in cooperation with the first sensor 14. In other words, the pulling-out prevention member 9 is used as a part of an insertion detection function of a card 2. Therefore, another member for detecting insertion of a card 2 in cooperation with the first sensor 14 is not required to provide separately. Accordingly, a structure of the card reader 1 can be simplified.

The pulling-out prevention member 9 is formed in a long and thin bar shape in which the card abutting part 9b, the turning center part 9a and the abutted part 9c are disposed in this order in the front and rear direction. Therefore, even in a case that the lock member 40 is abutted with the abutted part 9c and turning of the pulling-out prevention member 9 is restricted, a card 2 can be pulled out by resiliently bending the pulling-out prevention member 9 between the turning center part 9a and the card abutting part 9b. Accordingly, if necessary, even in a case that a card 2 is required to be pulled out in a state that turning of the pulling-out prevention member 9 is restricted, an excessive stress can be prevented from being applied to the pulling-out prevention member 9 and the lock member 40. As a result, damage of the pulling-out prevention member 9 and the lock member 40 can be prevented.

Second Embodiment

Figure 5A:
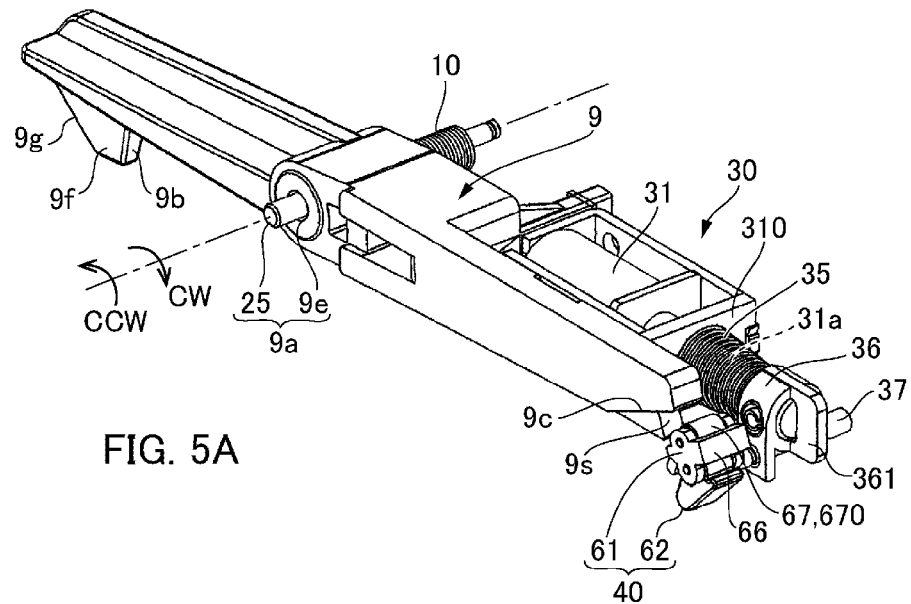
FIGS. 5A and 5B are perspective views showing a pulling-out prevention member, a lock member drive mechanism and the like of a card reader in accordance with a second embodiment of the present invention.
Figure 5B:
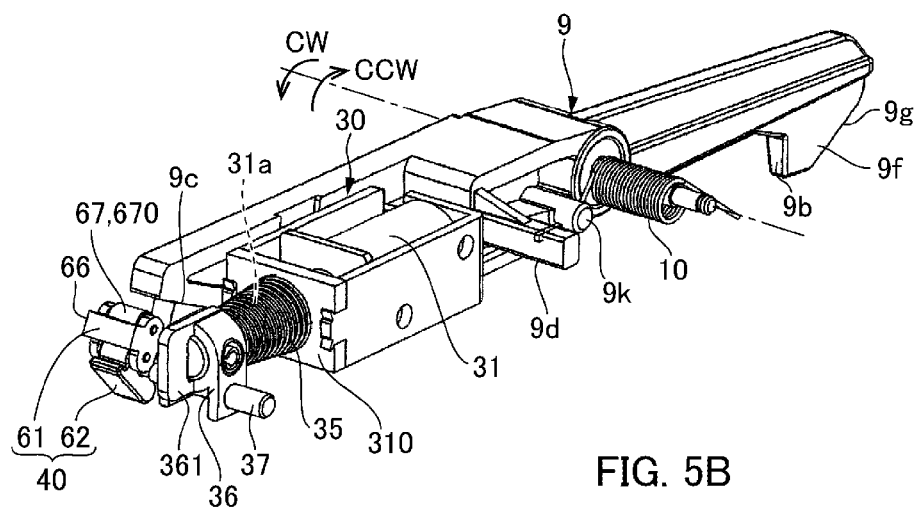
Figure 6A:
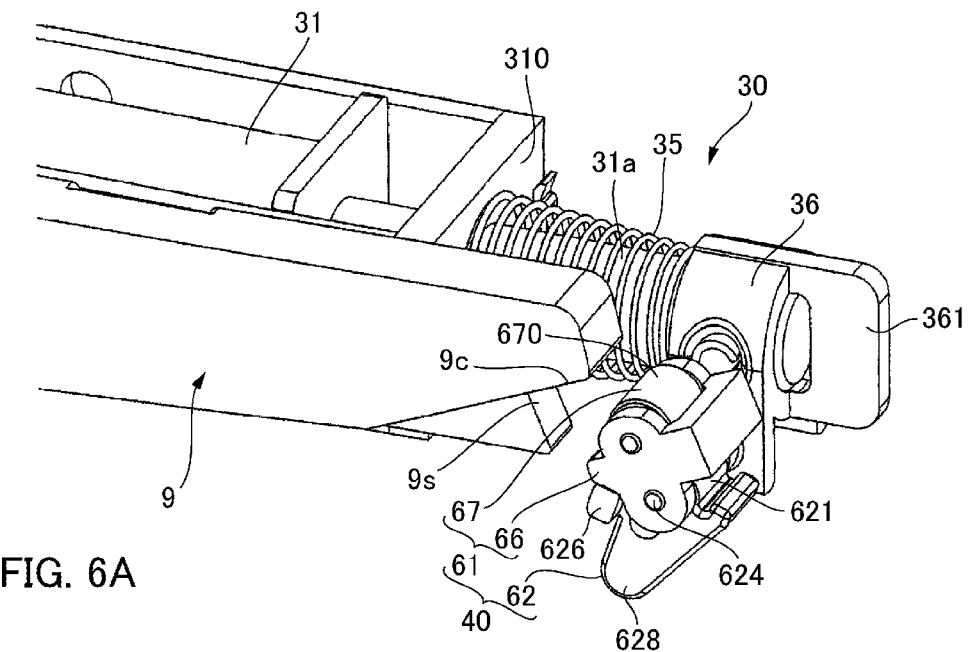
FIGS. 6A and 6B are enlarged explanatory views showing an unlocking attitude of a lock member shown in FIGS. 5A and 5B.
Figure 6B:
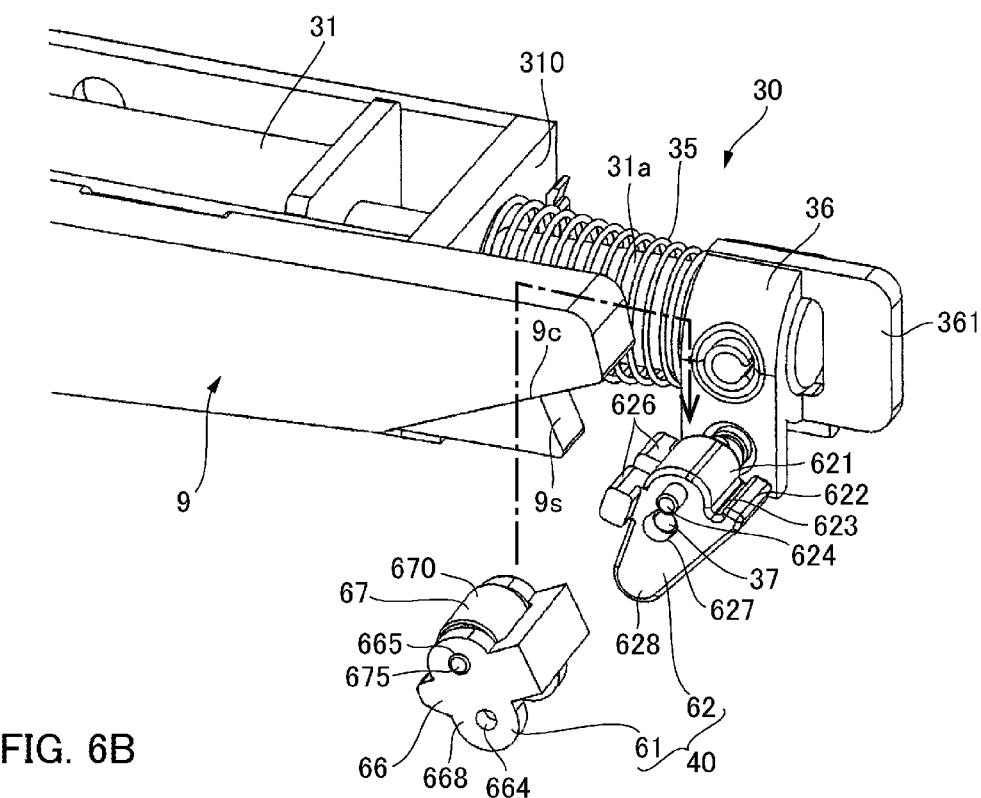
Figure 7:
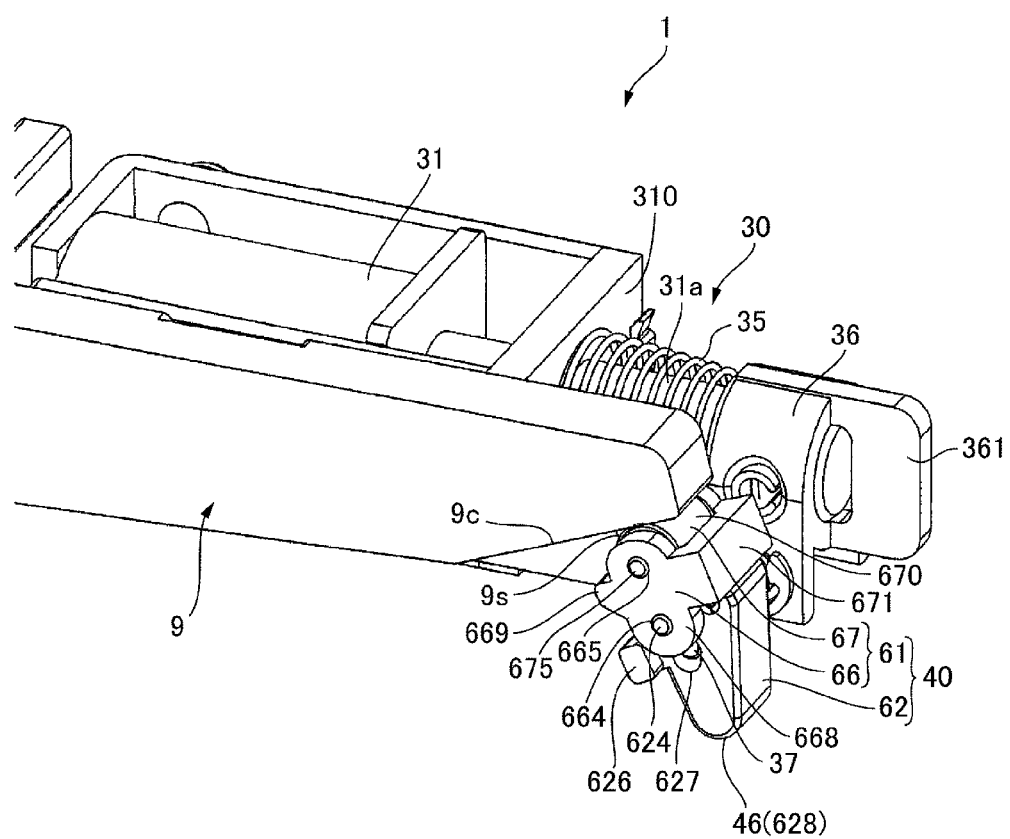
FIG. 7 is a perspective view showing a locking attitude of a lock member shown in FIGS. 5A and 5B.
Figure 8A:
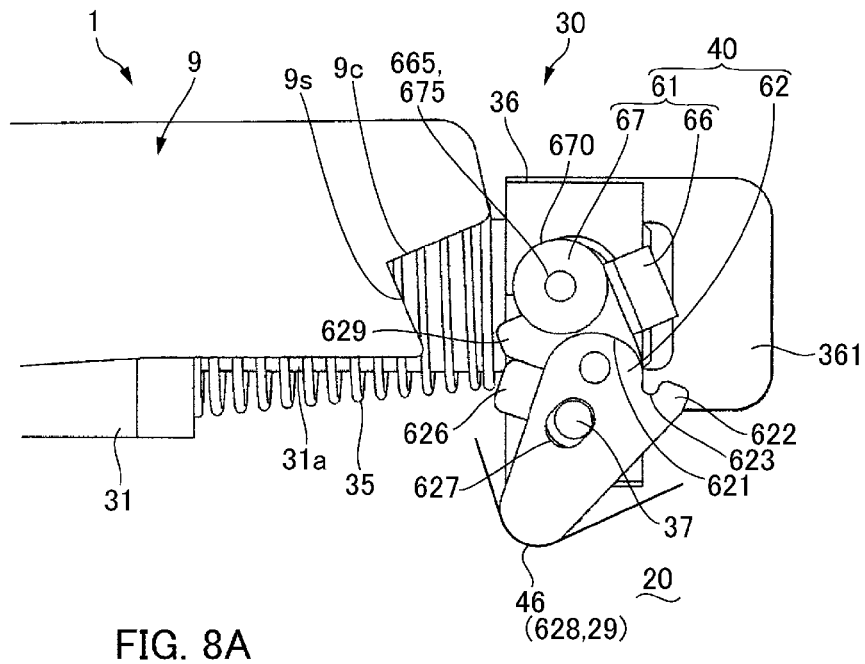
FIGS. 8A and 8B are cross-sectional views showing an operation of a lock member shown in FIGS. 5A and 5B.
Figure 8B:
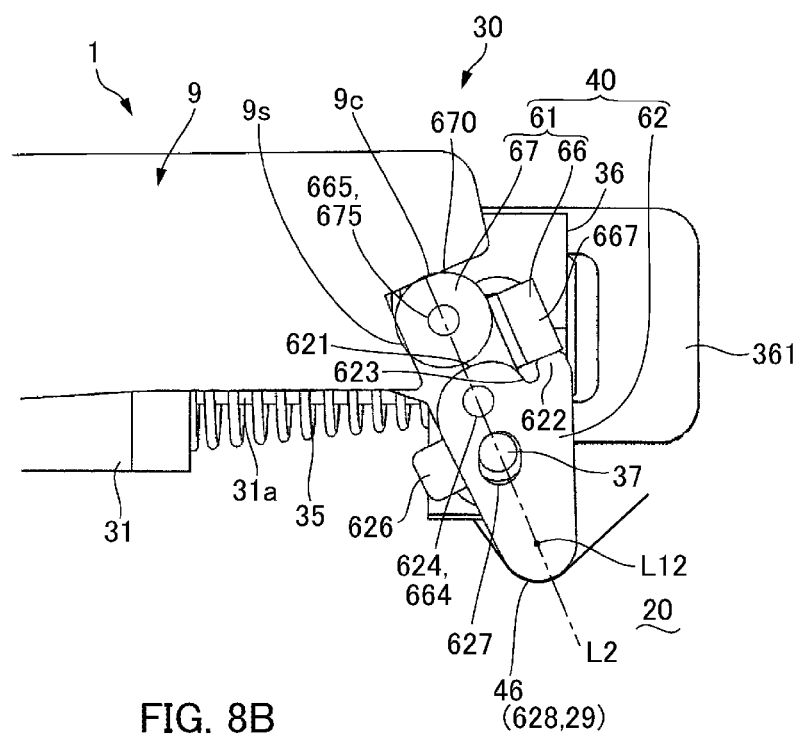

FIGS. 5A and 5B are perspective views showing a pulling-out prevention member 9, a lock member drive mechanism and the like of a card reader 1 in accordance with a second embodiment of the present invention. FIG. 5A is a perspective view showing a pulling-out prevention member 9 and the like which are viewed from a right side on a rear side and FIG. 5B is a perspective view showing the pulling-out prevention member 9 and the like which are viewed from a left side on the rear side. FIGS. 6A and 6B are enlarged explanatory views showing an unlocking attitude of a lock member 40 shown in FIGS. 5A and 5B. FIG. 6A is a perspective view showing a lock member 40 and the like and FIG. 6B is a perspective view in which the lock member 40 is disassembled. FIG. 7 is a perspective view showing a locking attitude of the lock member 40 shown in FIGS. 5A and 5B. FIGS. 8A and 8B are cross-sectional views showing an operation of the lock member 40 shown in FIGS. 5A and 5B. FIG. 8A is a cross-sectional view showing the lock member 40 and the like in an unlocking attitude and FIG. 8B is a cross-sectional view showing the lock member 40 and the like in a locking attitude. A basic structure in this embodiment is similar to the first embodiment and thus the same reference signs are used in common portions and their detailed descriptions are omitted.

As shown in FIGS. 5A through 8B, a pulling-out prevention member 9 used in the card reader 1 in the second embodiment is, similarly to the first embodiment, provided with a turning center part 9a which is a turning center of the pulling-out prevention member 9, a card abutting part 9b configured to abut with a rear end (near end, the "X1" direction side) of a card 2 and prevent pulling-out of the card 2, and an abutted part 9c configured to abut with a lock member 40. The card abutting part 9b, the turning center part 9a and the abutted part 9c are disposed from the front side in the moving direction of a card 2 toward the rear side in this order. The abutted part 9c is formed to be an inclined face which is gradually inclined in an upper direction as going to the rear side. In this embodiment, an inclined face 9s which is gradually inclined in a lower direction as going to the rear side is formed at an end part on the rear side of the pulling-out prevention member 9.

The card reader 1 in the second embodiment also includes, similarly to the first embodiment, a lock member drive mechanism 30 and a lock member 40 which is driven by the lock member drive mechanism 30 in order to prevent pulling-out of a card 2 in the state described with reference to FIG. 2C. The lock member 40 is driven by the lock member drive mechanism 30 so as to be swung around an axial line "L12" with a swing support point 46 structured between the lock member 40 and the fixed body 20 as a swing center, and the lock member 40 is switched to an unlocking attitude (see FIG. 8A) in which turning toward an open position of the pulling-out prevention member 9 is permitted and a locking attitude (see FIG. 8B) in which the lock member 40 is interfered with the pulling-out prevention member 9 and turning toward the open position of the pulling-out prevention member 9 is prevented.

In this embodiment, the lock member 40 includes a first member 61 provided with an abutting part 670 structured to abut with the pulling-out prevention member 9 in the locking attitude, and a second member 62 which is connected with the first member 61 through support shafts 624. The support shafts 624 are protruded from the second member 62 to both right and left sides and two support shafts 624 are respectively fitted into shaft holes 664 formed in two side plate parts 668 of the first member 61 faced each other in the right and left direction. Therefore, the first member 61 and the second member 62 are relatively turnable to each other with the support shafts 624 as a center.

The second member 62 is formed so that a dimension in the front and rear direction is reduced from an upper side to a lower side. An end part 628 on the lower side of the second member 62 which is located on an opposite side to the first member 61 structures a swing support point 46 together with the fixed body 20. More specifically, the end part 628 on the lower side of the second member 62 is formed to be a cylindrical convex curved face, and the fixed body 20 is formed with a cylindrical concave curved face 29 which receives the end part 628 of the second member 62. Therefore, the swing support point 46 which swingably supports the second member 62 around the axial line "L12" extended in the right and left direction is formed by the end part 628 of the second member 62 and the concave curved face 29 of the fixed body 20. In this embodiment, the swing support point 46 is structured of the convex curved face and the concave curved face. However, the swing support point 46 may be structured of a support shaft and a shaft hole.

An upper side portion of the second member 62 is formed with a cylindrical convex curved face 621 located on a front side and a protruded part 622 which is provided on a rear side with respect to the convex curved face 621 so as to be adjacent to the convex curved face 621 through a groove-shaped recessed part 623. The support shafts 624 are protruded to both right and left sides from a portion structuring the convex curved face 621. Further, a front face of the second member 62 is provided with a protruded part 626 protruded to the front side at two positions separated from each other in the right and left direction.

The first member 61 is structured of a holder 66 and a roller 67 held by the holder 66. An abutting part 670 structured to abut with the pulling-out prevention member 9 is structured by a roller face of the roller 67. The holder 66 is provided with side plate parts 668 on both right and left sides, a rear side connecting part 667 which connects outer side edges of two side plate parts 668 on the rear side, and a front side connecting part 669 which connects outer side edges of the two side plate parts 668 on the front side. Shaft holes 664 into which the support shafts 624 are fitted are formed on lower side portions of the side plate parts 668. Upper side portions of the side plate parts 668 are fitted with support shafts 675 which are protruded in the right and left direction from side faces of the roller 67. The roller 67 is rotatable with respect to the holder 66 with the support shafts 675 as a center.

Also in this embodiment, similarly to the first embodiment, the lock member drive mechanism 30 includes a solenoid 31 structured to swing the lock member 40 to the front side, and a second urging member 35 which urges the lock member 40 to the rear side so that the abutting part 670 of the lock member 40 is separated from the abutted part 9c of the pulling-out prevention member 9 to the rear side. The second urging member 35 is a compression coil spring which is disposed around the plunger 31a. The second urging member 35 is compressed between a main body part 310 of the solenoid 31 and a cap 36 provided on a tip end side of the plunger 31a and urges the cap 36 to the rear side. Further, the cap 36 and a tip end part of the plunger 31a are connected with the lock member 40 through a connecting shaft 37. In this embodiment, the connecting shaft 37 is fitted into a shaft hole 627 of the second member 62 which is formed between the end part 628 (swing support point 46) and the support shaft 624.

In the lock member drive mechanism 30 structured as described above, in a non-driven state in which the solenoid 31 is not energized, the plunger 31a and the cap 36 are protruded to the rear side by an urging force of the second urging member 35. Therefore, as shown in FIG. 8A, the lock member 40 is set in an unlocking attitude in which the second member 62 is inclined to the rear side with the swing support point 46 as a center. In this case, the protruded parts 626 of the second member 62 press the front side connecting part 669 of the first member 61. Therefore, the abutting part 670 of the lock member 40 is separated from the abutted part 9c of the pulling-out prevention member 9 to the rear side.

On the other hand, in a driven state that the solenoid 31 is energized, the plunger 31a is attracted to the front side against an urging force of the second urging member 35. Therefore, as shown in FIG. 8B, the lock member 40 is turned to a locking attitude in which the second member 62 is inclined to the front side with the swing support point 46 as a center. In this case, the protruded part 622 of the second member 62 presses the rear side connecting part 667 of the first member 61 to the front side. As a result, a roller face (abutting part 670) of the roller 67 is abutted with the abutted part 9c of the pulling-out prevention member 9 and prevents turning of the pulling-out prevention member 9 in a direction to the open attitude. Therefore, even when a card 2 is tried to be pulled out, the pulling-out of the card 2 is prevented by the pulling-out prevention member 9.

In this state, the swing support point 46 of the lock member 40 is located in a pressing direction in which the pulling-out prevention member 9 presses the lock member 40. More specifically, the swing support point 46 is located on an imaginary line "L2" when the imaginary line "L2" is drawn from a position of the abutted part 9c of the pulling-out prevention member 9 with which the abutting part 670 of lock member 40 is contacted so as to be perpendicular to the abutted part 9c. Especially, in this embodiment, a roller face (abutting part 670) of the roller 67 is entered between the abutted part 9c and the inclined face 9s of the pulling-out prevention member 9 and further movement of the roller 67 is prevented. Therefore, an abutting portion of the abutted part 9c of the pulling-out prevention member 9 with the abutting part 670 (roller face) of the lock member 40 can be controlled and thus a state can be surely realized in which the swing support point 46 of the lock member 40 is located in the pressing direction in which the pulling-out prevention member 9 presses the lock member 40. Further, in this state, the support shaft 624 which connects the first member 61 with the second member 62 is also located substantially on the imaginary line "L2" as shown in FIG. 8B.

As described above, also in the second embodiment, similarly to the first embodiment, the pulling-out prevention member 9 is not required to be turned by power of the solenoid 31 and the pulling-out prevention member 9 is not required to maintain a state that the card moving passage 6 is closed by using the power of the solenoid 31. Therefore, even when the solenoid 31 having a small output is used, pulling-out of a card 2 can be prevented and a large electric current is not required to be supplied to the solenoid 31 during operation. Further, the lock member 40 is driven by the lock member drive mechanism 30 and is swung with the swing support point 45 as a center so that the lock member 40 is switched to an unlocking attitude which permits turning of the pulling-out prevention member 9 toward the open position and to a locking attitude in which the lock member 40 is interfered with the pulling-out prevention member 9 to prevent turning of the pulling-out prevention member 9 toward the open position. In addition, when the lock member 40 is set in the locking attitude, the swing support point 46 between the lock member 40 and the fixed body 20 and the swing support point (the support shaft 624 and the shaft hole 664) between the first member 61 and the second member 62 are located in a pressing direction in which the pulling-out prevention member 9 presses the lock member 40. Therefore, even when the lock member 40 receives a large load from the pulling-out prevention member 9, the load can be received by the swing support point 46 and thus a large load is not applied to the solenoid 31 of the lock member drive mechanism 30. Accordingly, a state that the plunger 31*a* of the solenoid 31 is inclined to cause the lock member 40 to incline is hard to be occurred. Further, the lock member 40 is structured to be swung and thus the pulling-out prevention member 9 can be surely switched to an unlocking attitude by an urging force of the second urging member 35. Therefore, similar effects to the first embodiment can be attained, for example, the pulling-out prevention member 9 is operated surely.

In this embodiment, the abutting part 670 of the lock member 40 is a roller face of the roller 67 and thus a frictional resistance between the pulling-out prevention member 9 and the abutting part 670 of the lock member 40 is small and thus the abutting part 670 can be abutted smoothly. Therefore, switching between the locking attitude and the unlocking attitude of the lock member 40 is surely performed. In accordance with an embodiment of the present invention, the structure that the abutting part of the lock member 40 is structured of a roller face may be applied to the first embodiment.

Third Embodiment

In the lock member drive mechanism 30 in the first and the second embodiments, the solenoid 31 drives the lock member 40 from the unlocking attitude to the locking attitude and the second urging member 35 urges the lock member 40 from the locking attitude to the unlocking attitude. However, it may be structured that the solenoid 31 drives the lock member 40 to the unlocking attitude and the second urging member 35 drives the lock member 40 to the locking attitude.

Fourth Embodiment

In the lock member drive mechanisms 30 in the first, the second and the third embodiments, the solenoid 31 drives the lock member 40 from one of the locking attitude and the unlocking attitude to the other of the locking attitude and the unlocking attitude, and the second urging member 35 drives the lock member 40 from the other of the locking attitude and the unlocking attitude to the one of the locking attitude and the unlocking attitude. However, it may be structured that the solenoid 31 drives the lock member 40 from one of the locking attitude and the unlocking attitude to the other of the locking attitude and the unlocking attitude and, in addition, the solenoid 31 also drives the lock member 40 from the other of the locking attitude and the unlocking attitude to the one of the locking attitude and the unlocking attitude. According to this structure, the second urging member 35 is omitted.

Other Embodiments

In the embodiments described above, the lock member drive mechanism 30 switches the lock member 40 from the unlocking attitude to the locking attitude. However, it may be structured that the lock member drive mechanism 30 switches the lock member 40 from the locking attitude to the unlocking attitude.

Although the present invention has been shown and described with reference to a specific embodiment, various changes and modifications will be apparent to those skilled in the art from the teachings herein. For example, in the embodiments described above, the card abutting part 9*b* which is capable of abutting with a rear end of a card 2 to be pulled out is formed to be a perpendicular face in a flat shape which is substantially perpendicular to the "X" direction. However, the card abutting part 9*b* may be formed to be an inclined face in a flat shape which is gradually inclined to a lower direction as going toward the front side. According to this structure, in a case that turning of the pulling-out prevention member 9 is restricted, when a card 2 being pulled out is abutted with the card abutting part 9*b* of the pulling-out prevention member 9, a force toward an upper direction is easily generated in the card abutting part 9*b* and thus a portion between the turning center part 9*a* and the card abutting part 9*b* is easily bent resiliently. As a result, the card 2 can be easily pulled out and damage of the pulling-out prevention member 9 and the lock member 40 can be prevented effectively.

In the embodiments described above, a torsion coil spring is used for the first urging member 10 and a compression coil spring is used in the second urging member 35. However, another spring member such as a plate springs may be used. In the embodiments described above, when the solenoid 31 is driven, the plunger 31*a* is attracted to the front side to swing the lock member 40. However, it may be structured that, when the solenoid 31 is driven, the plunger 31*a* is attracted to the rear side to swing the lock member 40. Further, it may be structured that, when the solenoid 31 is driven, the plunger 31*a* is moved in the right and left direction to swing the lock member 40.

In the embodiments described above, the lock member 40 is disposed on the rear end side to restrict turning of the pulling-out prevention member 9 on the rear end side. However, it may be structured that the lock member 40 is disposed on the front end side and turning of the pulling-out prevention member 9 is prevented on the front end side. In this case, no abutted part 9*c* may be formed in the pulling-out prevention member 9.

In the embodiments described above, the first sensor 14 is an optical type sensor but the first sensor 14 may be a mechanical sensor such as a micro-switch.

In the embodiments described above, the card reader 1 includes the magnetic head 3 and the IC contact points 4.

However, the card reader 1 may include only one of the magnetic head 3 and the IC contact points 4. In a case that the card reader 1 includes only the magnetic head 3, a card 2 is not required to be fixed with an IC chip. Further, in the embodiments described above, the card reader 1 is a manual type card reader. However, the structure of the present invention may be applied to a card reader having an automatic conveying mechanism for a card 2.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A card reader for use with a card, the card reader comprising:
    a fixed body comprising a card moving passage along which the card is moved;
    a pulling-out prevention member supported by the fixed body and structured to turn between a closing position closing the card moving passage and an open position opening the card moving passage, the pulling-out prevention member being further structured to prevent pulling-out of the card at the closing position;
    a first urging member structured to urge the pulling-out prevention member toward the closing position;
    a lock member structured to prevent turning of the pulling-out prevention member toward the open position;
    a lock member drive mechanism structured to drive the lock member; and
    a swing support point provided between the lock member and the fixed body, the swing support point being structured to switch the lock member to an unlocking attitude and to a locking attitude;
    wherein the lock member is structured to be driven by the lock member drive mechanism and swung with the swing support point as a center so that the lock member is switched from one of the unlocking attitude permitting turning of the pulling-out prevention member toward the open position and the locking attitude interfering with the pulling-out prevention member and preventing turning of the pulling-out prevention member toward the open position to the other of the unlocking attitude and the locking attitude.

2. The card reader according to claim 1, wherein when the lock member is set in the locking attitude, the swing support point is located in a direction in which the pulling-out prevention member presses the lock member.

3. The card reader according to claim 2, wherein the lock member is a movable arm provided on one side end part in an extending direction of the lock member with an abutting part structured to abut with the pulling-out prevention member in the locking attitude.

4. The card reader according to claim 3, wherein the movable arm is connected with a connecting shaft, which is moved by the lock member drive mechanism, between the abutting part and the swing support point.

5. The card reader according to claim 3, wherein the abutting part is a roller face of a roller provided in the lock member.

6. The card reader according to claim 2, wherein the lock member comprises:
    a first member provided with an abutting part structured to abut with the pulling-out prevention member in the locking attitude; and
    a second member which is connected with the first member through a support shaft and is relatively turnable to the first member with the support shaft as a center, and the second member structures the swing support point together with the fixed body.

7. The card reader according to claim 6, wherein an end part of the second member on an opposite side to the first member structures the swing support point together with the fixed body.

8. The card reader according to claim 6, wherein the second member is connected with a connecting shaft which is moved by the lock member drive mechanism.

9. The card reader according to claim 6, wherein the abutting part is a roller face of a roller provided in the first member of the lock member.

10. The card reader according to claim 1, wherein the lock member drive mechanism comprises:
    a solenoid structured to drive the lock member from one of the unlocking attitude and the locking attitude to the other of the unlocking attitude and the locking attitude; and
    a second urging member structured to urge the lock member from the other of the unlocking attitude and the locking attitude to the one of the unlocking attitude and the locking attitude.

11. The card reader according to claim 10, wherein when the lock member is set in the locking attitude, the swing support point is located in a direction in which the pulling-out prevention member presses the lock member.

12. The card reader according to claim 11, wherein the lock member is a movable arm provided on one side end part in an extending direction of the lock member with an abutting part structured to abut with the pulling-out prevention member in the locking attitude.

13. The card reader according to claim 12, wherein the movable arm is connected with a connecting shaft, which is moved by the lock member drive mechanism, between the abutting part and the swing support point.

14. The card reader according to claim 12, wherein the abutting part is a roller face of a roller provided in the lock member.

15. The card reader according to claim 1, wherein the lock member drive mechanism comprises a solenoid structured to drive the lock member from one of the unlocking attitude and the locking attitude to the other of the unlocking attitude and the locking attitude, and also drive the lock member from the other of the unlocking attitude and the locking attitude to the one of the unlocking attitude and the locking attitude.

16. The card reader according to claim 15, wherein when the lock member is set in the locking attitude, the swing support point is located in a direction in which the pulling-out prevention member presses the lock member.

17. The card reader according to claim 16, wherein the lock member is a movable arm provided on one side end part in an extending direction of the lock member with an abutting part structured to abut with the pulling-out prevention member in the locking attitude.

18. The card reader according to claim 1, wherein the pulling-out prevention member is structured to be turnable around an axial line which is parallel to a width direction of the card substantially perpendicular to a moving direction of the card and a thickness direction of the card.

19. The card reader according to claim 18, wherein
the pulling-out prevention member comprises;
a turning center part which is a turning center of the pulling-out prevention member;
a card abutting part structured to abut with an end face of the card to prevent pulling-out of the card; and
an abutted part with which the lock member is abutted in the locking attitude, and
the card abutting part, the turning center part and the abutted part are disposed in this order along the moving direction of the card.

20. The card reader according to claim 18, further comprising a sensor structured to detect insertion of the card,
wherein the pulling-out prevention member comprises an insertion detecting part for detecting the insertion of the card in cooperation with the sensor.

21. The card reader according to claim 1, wherein
the pulling-out prevention member comprises;
a turning center part which is a turning center of the pulling-out prevention member;
a card abutting part structured to abut with an end face of the card to prevent pulling-out of the card; and
an abutted part with which the lock member is abutted in the locking attitude, and
the card abutting part, the turning center part and the abutted part are disposed in this order along the moving direction of the card.

22. The card reader according to claim 1, further comprising a sensor structured to detect insertion of the card,
wherein the pulling-out prevention member comprises an insertion detecting part for detecting the insertion of the card in cooperation with the sensor.

* * * * *